(12) United States Patent
Takasaka et al.

(10) Patent No.: US 10,153,802 B2
(45) Date of Patent: Dec. 11, 2018

(54) WIRELESS COMMUNICATION DEVICE AND WIRELESS COMMUNICATION SYSTEM USING THE SAME

(71) Applicant: HONDA MOTOR CO., LTD., Tokyo (JP)

(72) Inventors: Tomokazu Takasaka, Tochigi (JP); Toshinori Inagawa, Tochigi (JP); Tatsuya Ippyo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/892,540

(22) Filed: Feb. 9, 2018

(65) Prior Publication Data

US 2018/0287656 A1 Oct. 4, 2018

(30) Foreign Application Priority Data

Mar. 29, 2017 (JP) ................................ 2017-066136

(51) Int. Cl.
*H04B 7/00* (2006.01)
*H04B 1/401* (2015.01)
(Continued)

(52) U.S. Cl.
CPC ........... *H04B 1/401* (2013.01); *H04B 1/0067* (2013.01); *H04B 7/12* (2013.01); *H04B 1/1081* (2013.01)

(58) Field of Classification Search
CPC ........ H04B 1/401; H04B 1/0067; H04B 7/12; H04B 1/1081
See application file for complete search history.

(56) References Cited

U.S. PATENT DOCUMENTS 8,125,940 B2 * 2/2012 Perlman ................ H04W 88/08
370/326
8,953,821 B2 * 2/2015 Pompei ................ B06B 1/0292
381/116

(Continued)

FOREIGN PATENT DOCUMENTS

| JP | 2004-254290 | 9/2004 |
| JP | 2004-320342 | 11/2004 |
| JP | 4609625 | 10/2010 |

OTHER PUBLICATIONS

Japanese Office Action dated Aug. 28, 2018, 4 pages.

*Primary Examiner* — Dominic E Rego
(74) *Attorney, Agent, or Firm* — Rankin, Hill & Clark LLP (57) ABSTRACT

A wireless communication device including a first transceiver which performs communication by using each of a plurality of channels contained in a first frequency band, a second transceiver which performs communication by using each of a plurality of channels contained in a second frequency band that is higher than the first frequency band and separated from the first frequency band through a separation band having a predetermined frequency span, and a control device connected to the first transceiver and the second transceiver capable of communicating with the first transceiver and the second transceiver, selects one channel from the plurality of channels of the fist frequency band and one channel from the plurality of channels of the second frequency band to set a channel pair including a pair of channels, and causes the first transceiver and the second transceiver to communicate the same data by using the set channel pair.

5 Claims, 10 Drawing Sheets

(51) Int. Cl.
*H04B 7/12* (2006.01)
*H04B 1/00* (2006.01)
*H04B 1/10* (2006.01)

(56) References Cited

U.S. PATENT DOCUMENTS

| | | | |
|---|---|---|---|
| 8,989,753 B2* | 3/2015 | Aunkofer | H04W 52/0229 455/450 |
| 9,565,566 B1* | 2/2017 | Boppana | H04W 16/12 |
| 9,706,442 B2* | 7/2017 | Hageltorn | H04W 36/0016 |
| 2004/0061567 A1* | 4/2004 | Mattsson | H03J 1/0008 333/17.1 |
| 2008/0254747 A1* | 10/2008 | Fu | H04B 1/406 455/66.1 |
| 2010/0128676 A1* | 5/2010 | Wu | H04L 45/308 370/328 |
| 2010/0226292 A1* | 9/2010 | Gorbachov | H04B 1/48 370/280 |
| 2012/0009886 A1* | 1/2012 | Poulin | H04B 1/0064 455/78 |
| 2012/0009888 A1* | 1/2012 | Smadi | H04W 72/1215 455/88 |
| 2012/0201146 A1* | 8/2012 | Shuey | H04W 40/14 370/252 |
| 2012/0288274 A1* | 11/2012 | Li | H04B 10/0775 398/16 |
| 2013/0077540 A1* | 3/2013 | Black | H04B 1/109 370/277 |
| 2013/0095883 A1* | 4/2013 | Hirsch | H04B 1/3805 455/553.1 |
| 2014/0349584 A1* | 11/2014 | Clevorn | H04B 7/0689 455/67.13 |
| 2016/0100023 A1* | 4/2016 | Kim | H04L 67/28 709/227 |
| 2016/0267729 A1* | 9/2016 | Baumgarte | H04W 12/06 |
| 2017/0094589 A1* | 3/2017 | Bhasin | H04W 48/16 |
| 2017/0195919 A1* | 7/2017 | Rittenhouse | H04L 43/0882 |
| 2017/0201997 A1* | 7/2017 | Cheng | H04W 72/082 |
| 2017/0245291 A1* | 8/2017 | Liu | H04L 1/0033 |
| 2017/0310369 A1* | 10/2017 | Oliver | H04B 7/0404 |
| 2018/0191451 A1* | 7/2018 | Lynch | H04B 17/19 |
| 2018/0249468 A1* | 8/2018 | Erceg | H04W 72/0453 |

* cited by examiner

WIRELESS COMMUNICATION DEVICE AND WIRELESS COMMUNICATION SYSTEM USING THE SAME

BACKGROUND OF THE INVENTION

Field of the Invention

The present invention relates to a wireless communication device and a wireless communication system using the same.

Description of the Related Art

Conventionally, there has been a problem that communication interruption occurs in wireless communication due to interference caused by multipass fading. For example, the following device (see Japanese Patent No. 4,609,625) has been disclosed as a device for avoiding communication interruption caused by multipass fading. This device is an interference canceling device that cancels interference among plural signals transmitted simultaneously from plural transmission antennas and received simultaneously by plural reception antennas, and includes plural interference cancelers. In the interference canceling device, at least one interference canceler corresponds to each of the transmitted signals, and each interference canceler receives a signal from each reception antenna and outputs interference-canceled reception version of the corresponding transmitted signal.

In the case of communication in an enclosed space such as a factor, an electric wave is reflected by a wall or a ceiling, and the influence of multipass fading becomes strong in some cases. Furthermore, a compact and inexpensive configuration and reliability are required to a communication device or system that is used in a communication area inside a factory or the like.

However, when a wireless communication system is configured by using the device described in Japanese Patent No. 4,609,625, there is a problem that installation of the canceler device complicates the system configuration, and also increases the size of the system, thereby increasing the cost. In addition, when the system is complicated and increased in size, there is also a problem that reliability to the system is lost from the viewpoint of risks of troubles of respective parts or error.

The present invention has been implemented in view of the foregoing problems, and has an object to provide a wireless communication device capable of avoiding communication interruption caused by multipass fading with a compact and inexpensive configuration, and a wireless communication system having reliability.

SUMMARY OF THE INVENTION

In order to solve the foregoing problems, a wireless communication device according to the present invention comprises: a first transceiver configured to perform communication by using each of a plurality of channels contained in a first frequency band; a second transceiver configured to perform communication by using each of a plurality of channels contained in a second frequency band that is higher than the first frequency band and separated from the first frequency band through a separation band having a predetermined frequency span; a first filter that is connected to the first transceiver and cuts frequency components of the second frequency band from frequency components passing through the first transceiver, a second filter that is connected to the second transceiver and cuts frequency components of the first frequency band from frequency components passing through the second transceiver, and a control device that is connected to the first transceiver and the second transceiver so as to be capable of communicating with the first transceiver and the second transceiver, selects one channel from the plurality of channels of the fist frequency band and one channel from the plurality of channels of the second frequency band to set a channel pair including a pair of channels, and causes the first transceiver and the second transceiver to communicate identical data by using the set channel pair.

The wireless communication device of the present invention sets the channel pair from the first frequency band and the second frequency band, and communicates the same data by using the channel pair, whereby redundancy of communication can be realized, and a communication error rate can be reduced.

The cut-off frequencies of the first filter and the second filter may be located in the separation band.

By using the first filter and the second filter as described above, the frequency components of the first frequency band to be transmitted by the first transceiver can be transmitted without being cut while cutting the frequency components of the second frequency band out of the frequency components passing through the first transceiver. Likewise, the frequency components of the second frequency band to be transmitted by the second transceiver can be transmitted without being cut while cutting the frequency components of the first frequency band out of the frequency components passing through the second transceiver.

The first transceiver, the second transceiver and the control device may be provided to a single board.

As described above, the first transceiver, the second transceiver and the control device are provided to the same board, whereby the device can be miniaturized.

A wireless communication system according to the present invention includes a plurality of wireless communication devices, each of the plurality of wireless communication devices comprising: a first transceiver configured to perform communication by using each of a plurality of channels contained in a first frequency band; a second transceiver configured to perform communication by using each of a plurality of channels contained in a second frequency band that is higher than the first frequency band and separated from the first frequency band through a separation band having a predetermined frequency span; and a control device that is connected to the first transceiver and the second transceiver so as to be capable of communicating with the first transceiver and the second transceiver, selects one channel from the plurality of channels of the fist frequency band and one channel from the plurality of channels of the second frequency band to set a channel pair including a pair of channels, and causes the first transceiver and the second transceiver to communicate identical data by using the set channel pair, wherein one wireless communication device out of the plurality of wireless communication devices transmits identical data to another wireless communication device out of the plurality of wireless communication devices by using the set channel pair, and the another wireless communication device receives the transmitted data by using either channel of the set channel pair.

According to the wireless communication system of the present invention, a communication trouble caused by multipass fading can be prevented, the communication system can be configured by a wireless communication device comprising a simple configuration, and a wireless communication system having reliability can be provided.

According to the present invention, since redundancy of communication can be realized with a compact and inexpensive configuration, a wireless communication device which avoids communication interruption caused by multi-pass fading can be provided, and a wireless communication system having reliability can be provided.

DETAILED DESCRIPTION OF THE PREFERRED EMBODIMENT

An embodiment according to the present invention will be described in more detail.

When redundancy of communication is performed in a frequency band such as an ISM (Industrial Science Medical) band which is a so-called 2.4 GHz band, there is a risk that side lobes of a transmission wave emitted from one communication circuit are input as an interference wave to another communication circuit arranged in the vicinity of the one communication circuit.

In this case, there is a problem that when the electric wave intensity of the side lobes of the interference wave is higher than the electric wave intensity of a main lobe of a frequency to be received by the communication circuit, reception cannot be normally performed.

According to the wireless communication device of the present invention, specific frequency components of side lobes in a frequency band output by a transceiver are cut by a bandpass filter to reduce an influence of the interference wave on another transceiver, thereby making it possible to perform redundancy within the ISM band.

Figure 1:
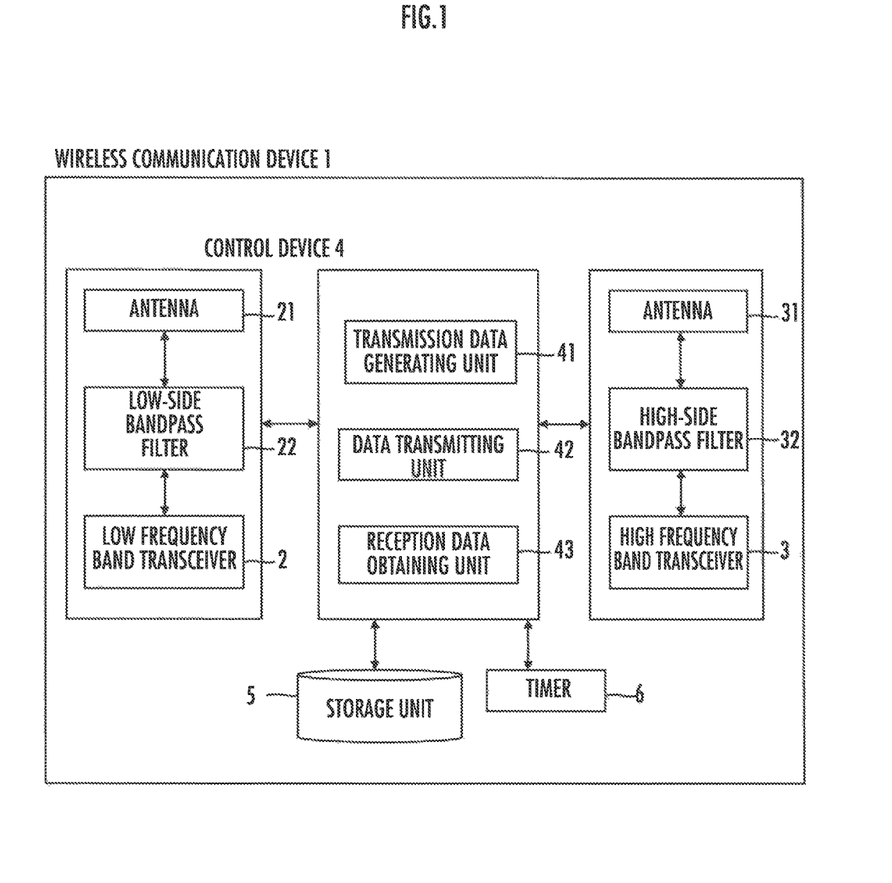
FIG. 1 is a block diagram showing the configuration of a wireless communication device according to the present invention.

The wireless communication device of the present invention is shown in FIG. 1.

The wireless communication device 1 is configured to comprise a low frequency band transceiver 2 as a first transceiver which performs communication in a frequency band ranging from 2402 to 2420 MHz (hereinafter also referred to as "low frequency band") which is a relatively low frequency band in the ISM band, a high frequency band transceiver 3 as a second transceiver which performs communication in a frequency band ranging from 2452 to 2470 MHz (hereinafter also referred to as "high frequency band") which is a relatively high frequency band in the ISM band, a control device 4 for causing the low frequency band transceiver 2 and the high frequency band transceiver 3 to communicate the same data, a storage unit 5 for storing the frequencies of carrier waves used in the low frequency band transceiver 2 and the high frequency band transceiver 3, and a timer 6 for providing period-of-time and time data to the control device 4. These components are mounted on the same board.

The control device 4 is connected to the low frequency band transceiver 2 and the high frequency band transceiver 3 by an IC pattern or a connector or cable connector so as to be capable of communicating with those transceivers 2 and 3, and comprises a transmission data generating unit 41 configured to generate transmission data. The control device 4 also comprises a data transmitting unit 42 configured to cause the low frequency band transceiver 2 and the high frequency band transceiver 3 to communicate the same transmission data.

Each of the transceivers 2 and 3 generates carrier waves modulated based on transmission data transmitted by the data transmitting unit 42, transmits the generated carrier waves, and demodulates received carrier waves to obtain reception data.

The control device 4 comprises a reception data obtaining unit 4 configured to obtain the reception data from each of the transceivers 2 and 3.

As described above, the low frequency band transceiver 2, the high frequency band transceiver 3 and the control device 4 are provided on a single board, and the connection between the control device 4 and the low frequency band transceiver 2 and the connection between the control device 4 and the high frequency band transceiver 3 are performed by an IC pattern, whereby in addition to achievement of miniaturization of the device, distribution impedance, a capacitance, a parasitic capacitance distribution, etc. can be made fixed. Therefore, dispersion among products can be reduced, and the operation can be stabilized.

The transmission data generating unit 41 generates transmission data, and also selects one low frequency band channel (hereinafter referred to as "ch") constituting the low frequency band and one high frequency band ch constituting the high frequency band, thereby setting a pair of channels (hereinafter referred to as "ch pair").

There are two types of transmission data. One type of transmission data is a Data packet in which information for causing a reception-destination device to perform a predetermined operation is recorded, and an Ack packet for returning, to a transmission source, an acknowledgment that the Data packet has been received at the reception-side device.

Figure 2A:
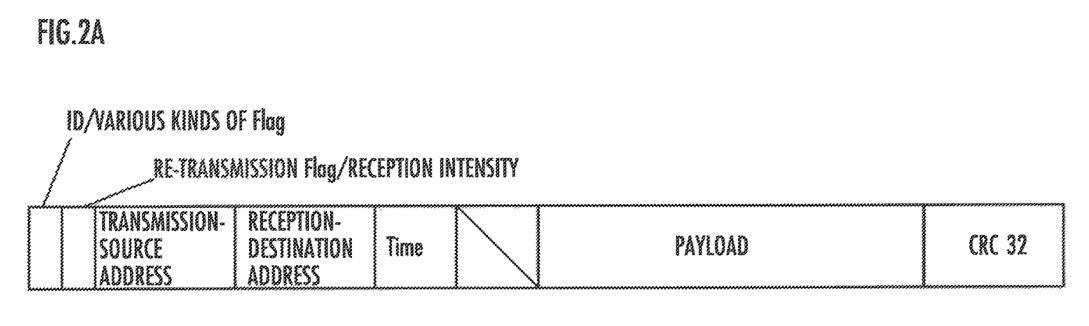
FIG. 2A is a diagram showing the structure of a Data packet.

As shown in FIG. 2A, the Data packet contains ID/Flag in which the packet type, etc. are recorded, re-transmission Flag/reception intensity representing re-transmission of a packet, a transmission-source address, a reception-destination address, a time (Time) in which the time at the transmission time point is recorded, payload, and CRC (Cyclic Redundancy Check) 32 for performing an error check.

Figure 2B:
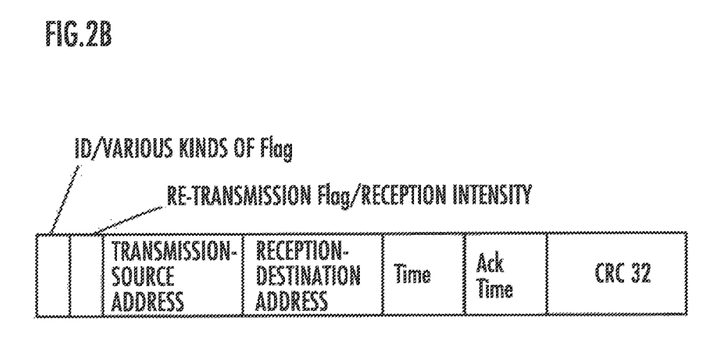
FIG. 2B is a diagram showing the structure of an Ack packet.

As shown in FIG. 2B, the Ack packet contains ID/Flag, a re-transmission Flag/reception intensity, a transmission-source address, a reception-destination address, a time (Time) recorded in the received data packet, an Ack time recording the period of time from the reception to the return of the acknowledgement, and CRC 32.

The storage unit 5 comprises, for example, a storage device such as a semiconductor memory capable of temporarily or continuously storing data. In the storage unit 5 are stored frequency band information on a table of channels of carrier waves used by the low frequency band transceiver 2 and the high frequency band transceiver 3, etc., information necessary for transmission data generated by the transmission data generating unit 41, data transmitted from each device connected to the wireless communication device 1, etc.

Table 1 represents the table of the channels used by the wireless communication device 1 according to this embodiment. As shown in Table 1 and as described above, in this embodiment, the frequency band ranging from 2402 to 2420 MHz is set as the low frequency band, and the frequency band ranging from 2452 to 2470 MHz is set as the high frequency band. A frequency band ranging from 2422 to 2450 MHz between the high frequency band and the low frequency band is set as a separation band.

Each of the low frequency band and the high frequency band is divided into bands each having 2 MHz, and Low 1ch to 10ch are provided in the low frequency band, and High 1ch to 10ch are provided in the high frequency band.

TABLE 1

| CENTER FREQUENCY (MHz) | CHANNEL |
| --- | --- |
| 2402 | Low 1 ch |
| 2404 | Low 2 ch |
| 2406 | Low 3 ch |
| 2408 | Low 4 ch |
| 2410 | Low 5 ch |
| 2412 | Low 6 ch |
| 2414 | Low 7 ch |
| 2416 | Low 8 ch |
| 2418 | Low 9 ch |
| 2420 | Low 10 ch |
| 2422-2450 | SEPARATION BAND |
| 2452 | High 1 ch |
| 2454 | High 2 ch |
| 2456 | High 3 ch |
| 2458 | High 4 ch |
| 2460 | High 5 ch |
| 2462 | High 6 ch |
| 2464 | High 7 ch |
| 2466 | High 8 ch |
| 2468 | High 9 ch |
| 2470 | High 10 ch |

The low frequency band transceiver 2 is connected to an antenna 21 capable of transmitting and receiving carrier waves. A low-side bandpass filter 22 as a second filter which is a bandpass filter for passing therethrough frequency components of a frequency band containing Low 1ch to 10ch and cutting (cutting off) frequency components of a high frequency band output from the low frequency band transceiver 2 is provided between the low frequency band transceiver 2 and the antenna 21. The low-side bandpass filter 22 may be a SAW (Surface Acoustic Wave) filter, for example. That is, the low frequency band transceiver 2 is connected to the antenna 21 via the low-side bandpass filter 22, and passes therethrough the frequency components of the low frequency band containing Low 1ch to 10ch out of the frequency components passing through the low frequency band transceiver 2 while cutting the frequency components of the high frequency band containing High 1ch to 10ch.

The low frequency band transceiver 2 is connected to the control device 4 so as to be capable of communicating with the control device 4 as described above. Furthermore, the low frequency band transceiver 2 includes a D/A converter (not shown) and an A/D converter (not shown), and also includes a transmission circuit (not shown) for generating carrier waves modulated based on transmission data, and a reception circuit (not shown) for demodulating received carrier waves to obtain reception data.

Accordingly, the transmission data transmitted from the data transmitting unit 42 of the control device 4 are subjected to analog conversion by the D/A modulator. The transmission circuit generates carrier waves modulated based on the transmission data which have been subjected to analog conversion, and transmits the carrier waves from the antenna 21.

Furthermore, the reception circuit of the low frequency band transceiver 2 demodulates carrier waves received from the antenna 21 to obtain reception data. The reception data are subjected to digital conversion by the A/D converter, and transmitted to a reception data obtaining unit 43 of the control device 4.

The high frequency band transceiver 3 is connected to an antenna 31 capable of transmitting and receiving carrier waves. A high-side bandpass filter 32 as a second filter which is a bandpass filter for passing therethrough frequency components of the frequency band of High 1ch to 10ch and cutting frequency components of a low frequency band output from the high frequency band transceiver 3 is provided between the high frequency band transceiver 3 and the antenna 31. Like the low-side bandpass filter 22, the high-side bandpass filter 32 may be a SAW filter.

That is, the high frequency band transceiver 3 is connected to the antenna 31 via the high-side bandpass filter 32, and passes therethrough the frequency components of the high frequency band containing High 1ch to 10ch out of the frequency components passing through the high frequency band transceiver 3 while cutting the frequency components of the low frequency band containing Low 1ch to 10ch.

The high frequency band transceiver 3 is connected to the control device 4 so as to be capable of communicating with the control device as described above. Furthermore, the high frequency band transceiver 3 includes a D/A converter (not shown) and an A/D converter (not shown), and also includes a transmission circuit (not shown) for generating carrier waves modulated based on transmission data and a reception circuit (not shown) for demodulating received carrier waves to obtain reception data.

Accordingly, the transmission data transmitted from the data transmitting unit 42 of the control device 4 are subjected to analog conversion by the D/A converter. The transmission circuit generates carrier waves modulated based on the transmission data which have been subjected to analog conversion, and transmits the transmission data from the antenna 31.

The reception circuit of the high frequency band transceiver 3 demodulates carrier waves received from the antenna 31 to obtain reception data. The reception data are subjected to digital conversion by the A/D converter, and transmitted to the reception data obtaining unit 43 of the control device 4.

Figure 3:
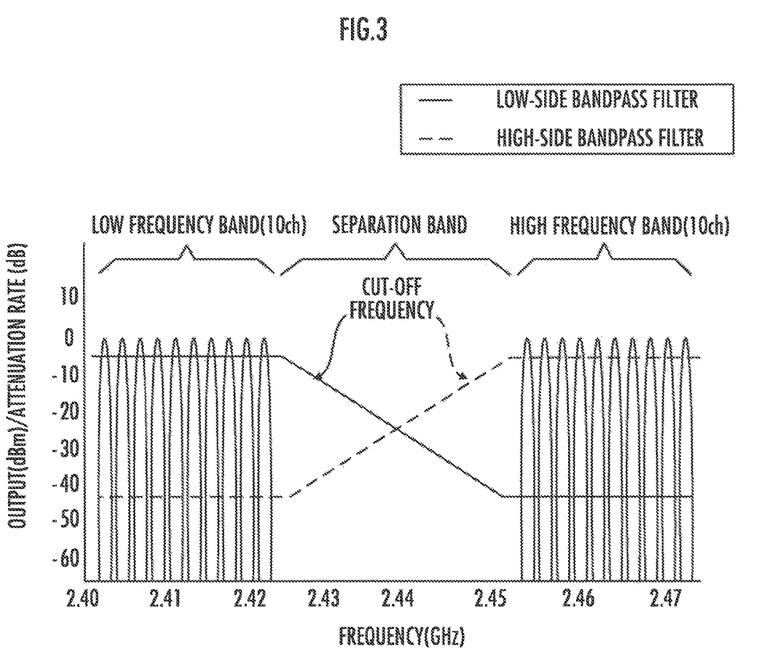
FIG. 3 is a graph showing the output/attenuation rate for the frequency of each ch of solid wireless.

The low-side bandpass filter 22 and the high-side bandpass filter 32 of this embodiment are SAW filters whose cut-off frequencies are located in the separation band (from 2422 MHz to 2450 MHz) as shown in FIG. 3.

The low-side bandpass filter 22 is provided between the low frequency band transceiver 2 and the antenna 21, and the low-side bandpass filter 22 is connected to each of the low frequency band transceiver 2 and the antenna 21, whereby the frequency components of the low frequency band transmitted by the low frequency band transceiver 2 can be transmitted without being cut while cutting the frequency components of the high frequency band (unnecessary side lobes).

The high-side bandpass filter 32 having a similar configuration is provided in the high frequency band transceiver 3, whereby the frequency components of the high frequency band transmitted by the high frequency band transceiver 3 can be transmitted without being cut while cutting the frequency components of the low frequency band (unnecessary side lobes).

Accordingly, the wireless communication device 1 of the present invention can perform communication while cutting the frequency components causing interference waves, so that redundancy of communication based on use of plural channels band can be performed in the ISM band.

Figure 4:
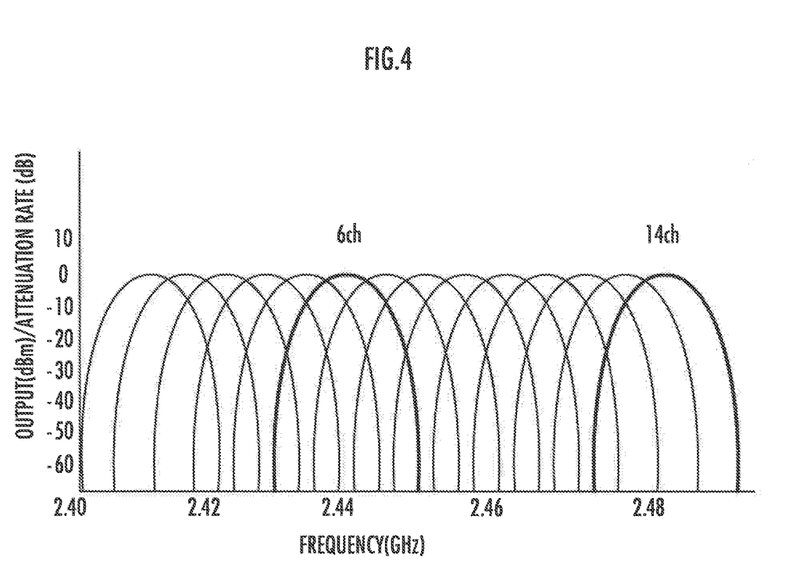
FIG. 4 is a graph showing the output/attenuation rate with respect to the frequency of each ch of wireless LAN.

As shown in FIG. 4, in the telecommunications standard of a normal wireless LAN (IEEE 802.11b or g, or the like), the frequency band per channel (1 ch) ranges from about 20 to 40 MHz. Accordingly, in order to perform communication by using the telecommunications standard of the normal wireless LAN so that no interference occurs between wireless communication devices 1, it is necessary to use channels having frequency bands which are sufficiently separated from each other. For example, in order to perform communication having little interference by using the normal wireless LAN standard, it is proper to use two channels of 6 ch and 14 ch. That is, there is a problem that it is impossible to perform communication on many channels when it is intended to establish redundant communication by using the normal wireless LAN standard.

Therefore, in the wireless communication device 1 according to this embodiment, the occupied bandwidth of the frequency band per channel is set to be narrow, whereby wireless communication is performed so that no interference occurs between the wireless communication devices 1 even when the wireless communication is performed on many channels.

For example, in the case where the occupied bandwidth per channel is set to 1 MHz, the communication can be performed with no interference between the wireless communication devices 1 even when 10 ch is set for each of the low frequency band and the high frequency band.

The wireless standard for preventing interference occurring between the wireless communication devices 1 by setting the occupied bandwidth per channel to a narrow value (1 MHz in this embodiment) as described above will be hereinafter referred to as "solid radio".

It is impossible in the solid radio to deal with a large data amount as compared with communication based on the normal wireless LAN standard because the occupied bandwidth per channel is narrow. Therefore, the application of the solid radio is limited to reception/transmission of data from/to a specific machine in production facilities or the like, and communication is performed with a reduced data amount.

Figure 5:
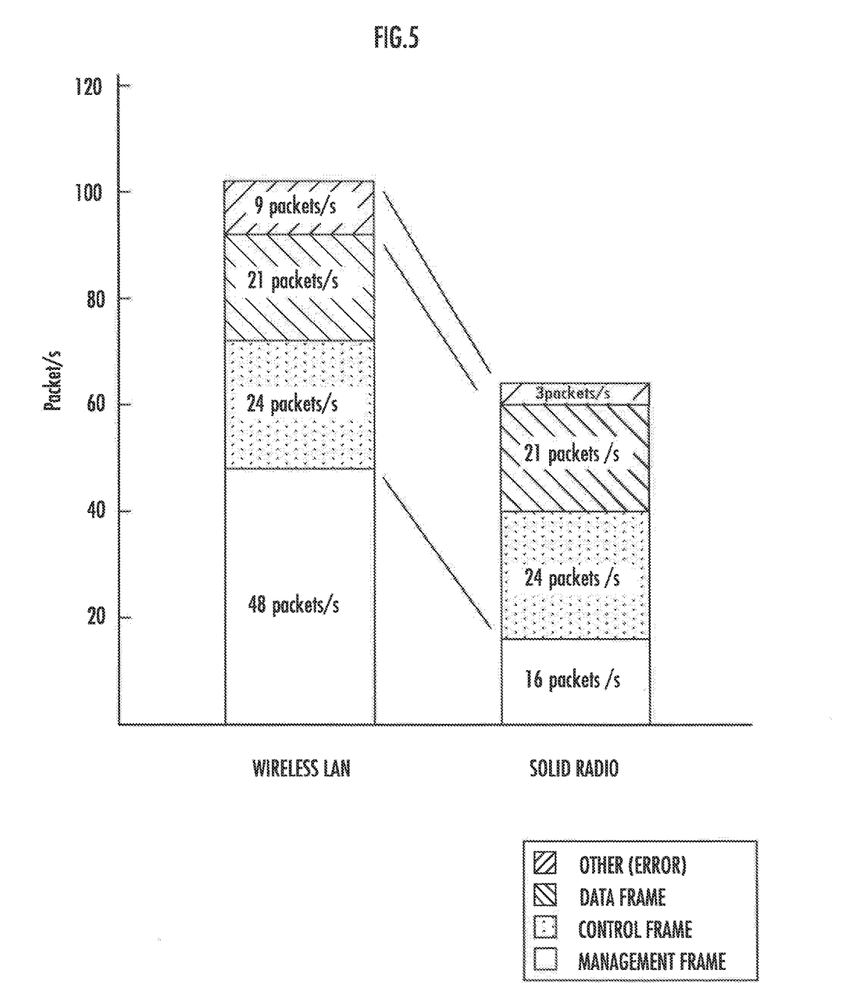
FIG. 5 is a graph showing the number of packets of each frame of data to be transmitted per second in the wireless LAN and the solid wireless.

For example, as shown in FIG. 5, in the normal wireless LAN standard, a management frame for maintaining the network occupies about a half of the entire data because the versatility of the system is high. Furthermore, since many types of devices constitute the system, error check data are required according to these types of devices.

On the other hand, with respect to the solid radio, by limiting the application of the solid radio to the communication with specific devices, the data amount of other frames such as a management frame and an error detection frame is reduced so that the amount of data associated with the management frame and errors is reduced to about one third. As a result, a sufficient amount of data frames can be transmitted/received even at a low transmission rate.

Since unit data used in the solid radio is configured by a smaller amount of data as compared with the wireless LAN, it is possible to perform communication even at a low transmission rate without increasing the communication time. By simplifying the unit data, the development term of the transceiver and devices to be used can be shortened, and also the development cost can be reduced. Furthermore, the data amount of the unit data is reduced to shorten the communication time for each unit data, thereby obtaining an advantage that the communication error rate in the wireless communication system 7 can be reduced.

That is, the stability of the wireless communication system can be enhanced by reducing the communication error rate.

An example in which the wireless communication system is configured by using the above-mentioned wireless communication device 1 will be described.

Figure 6:
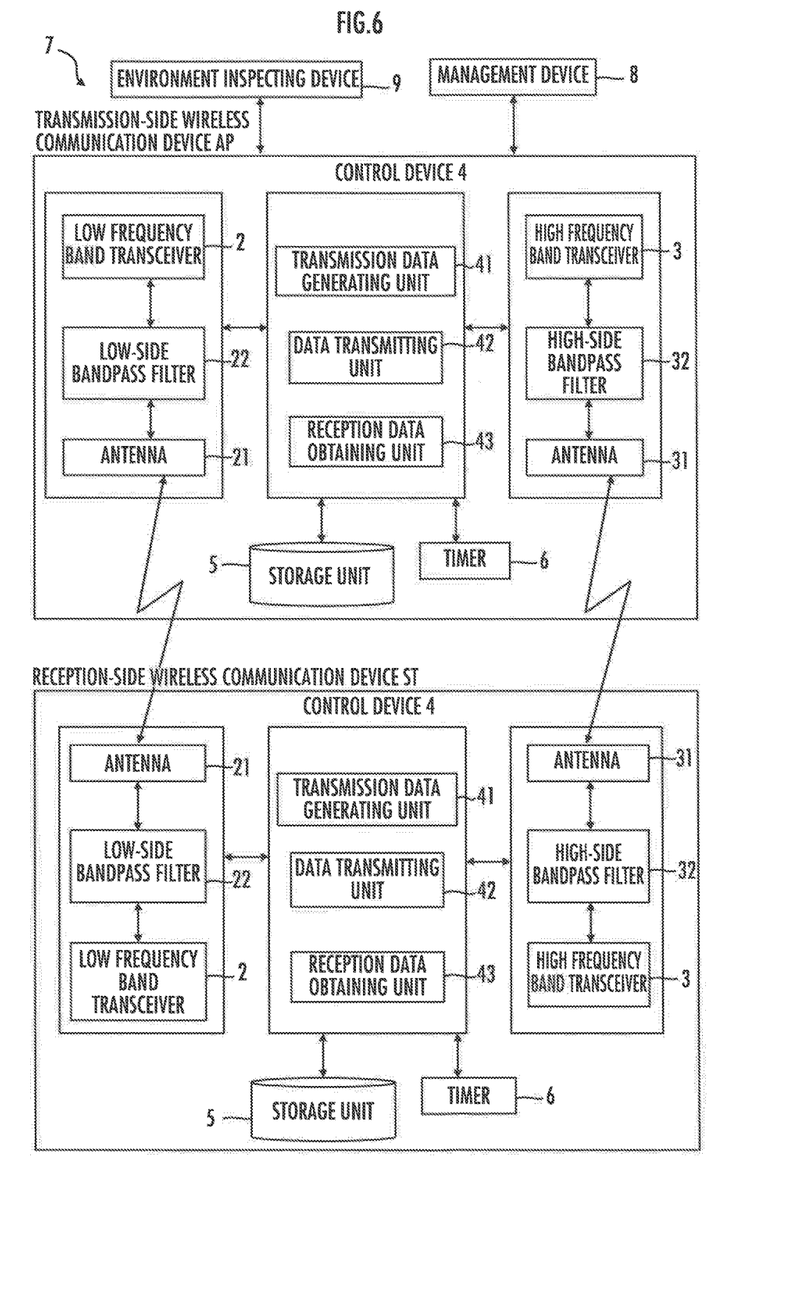
FIG. 6 is a block diagram showing the configuration of a wireless communication system of the present invention.

As shown in FIG. 6, the wireless communication system 7 includes a wireless communication device 1 disposed on a transmission side (hereinafter referred to as "transmission-side wireless communication device AP (Access Point)), a wireless communication device 1 disposed on a reception side (hereinafter referred to as "reception-side wireless communication device ST (Station)), a management device 8 for managing the wireless communication system 7, and an environment inspecting device 9 for inspecting a reception environment in a communication area of the transmission-side wireless communication device AP and the reception-side wireless communication device ST.

The transmission-side wireless communication device AP and the reception-side wireless communication device ST have the same configuration as the above-mentioned wireless communication device 1. The transmission-side wireless communication device AP and the reception-side wireless communication device ST are wirelessly connected to each other so as to be capable of performing data communication with each other.

The transmission-side wireless communication device AP is connected to the management device 8 and the environment inspecting device 9 so as to be capable of performing data communication with the management device 8 and the environment inspecting device 9.

The reception-side wireless communication device ST is connected to the control device 4 (not shown) so as to be capable of performing data communication with the control device 4, the control device 4 controlling an ST-installed device such as an automatic transporting machine for performing a predetermined operation based on the received Data packet.

The management device 8 transmits a predetermined instruction to the transmission-side wireless communication device AP, and comprises a computer including a central processing unit (CPU), a non-volatile memory such as ROM and a volatile memory such as RAM. The management device 8 transmits, to the transmission-side wireless communication device AP, a signal for instructing the ST-installed device to perform a predetermined operation.

The environment inspecting device 9 generates environment information representing the reception state of a specific frequency in the communication area of the transmission-side wireless communication device AP and the reception-side wireless communication device ST, and transmits the environment information to the transmission-side wireless communication device AP.

Figure 7:
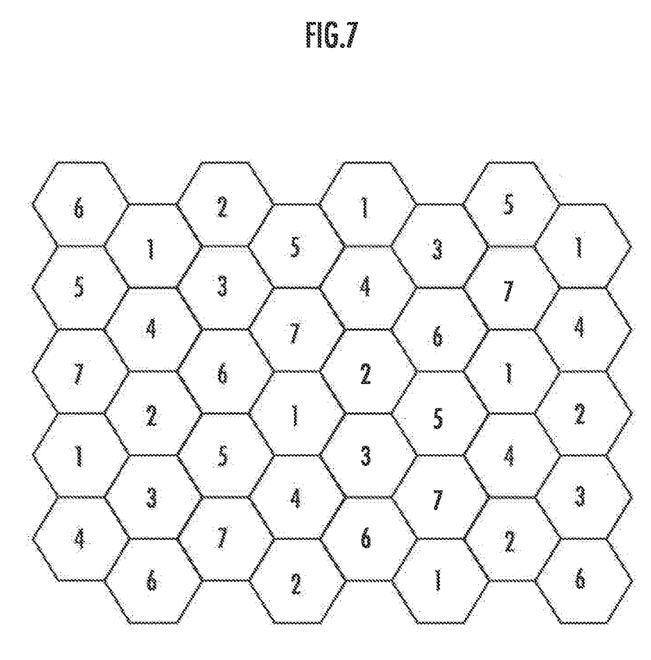
FIG. 7 is an image diagram showing environment information representing the reception state of a specific frequency.

As shown in FIG. 7, the environment information represents a ch number at which reception on any one of the low frequency band ch and the high frequency band ch is impossible, for example, every predetermined sectioned specific area. The environment information is stored in the storage unit 5 of the transmission-side wireless communication device AP. The environment information may be generated by performing inspection in advance when the wireless communication system is introduced. Furthermore, the reception-side wireless communication device ST may transmit information containing the position of the wireless communication device ST at which the reception-side wireless device ST fails in data reception and the channel used at that time, to the environment inspecting device 9 via the transmission-side wireless communication device AP, and environment information may be created or updated based on the thus-transmitted information.

Figure 8:
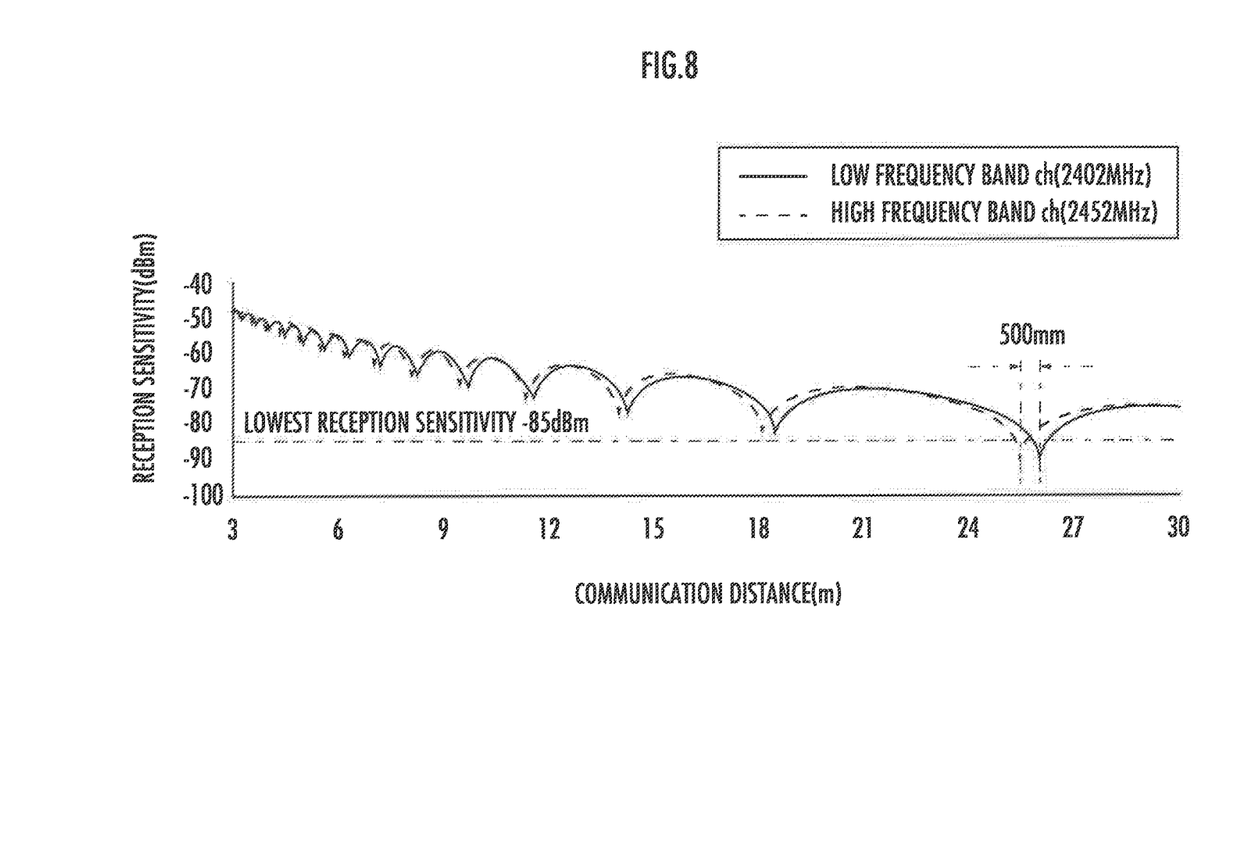
FIG. 8 is a graph showing reception sensitivity with respect to communication distance when wireless communication is performed by both of a low frequency band ch and a high frequency band ch.

FIG. 8 shows the reception sensitivity with respect to the communication distance on each ch when wireless communication is performed while the low frequency band ch is set to 2402 MHz and the high frequency band ch is set to 2452 MHz. As shown in FIG. 8, positions at which the electric wave intensity decreases due to interference such as multipass fading of each ch are farther away from each other as the communication distance is longer. For example, at the communication distance of about 25 m, places of the respective channels at which the reception sensitivity falls below the lowest reception sensitivity (−85 dBm) set in the normal wireless LAN standard are away from one another by 500 mm.

As described above, communication is performed by using both the low frequency band ch and the high frequency band ch, whereby the position at which the reception sensitivity falls below the lowest reception sensitivity of −85 (dBm) due to multipass fading can be deviated among the respective channels. Therefore, even when reception on one ch is impossible, the possibility of reception on another ch can be increased.

The operation of the system described above will be described based on a system flow shown in FIG. 6.

Figure 9:
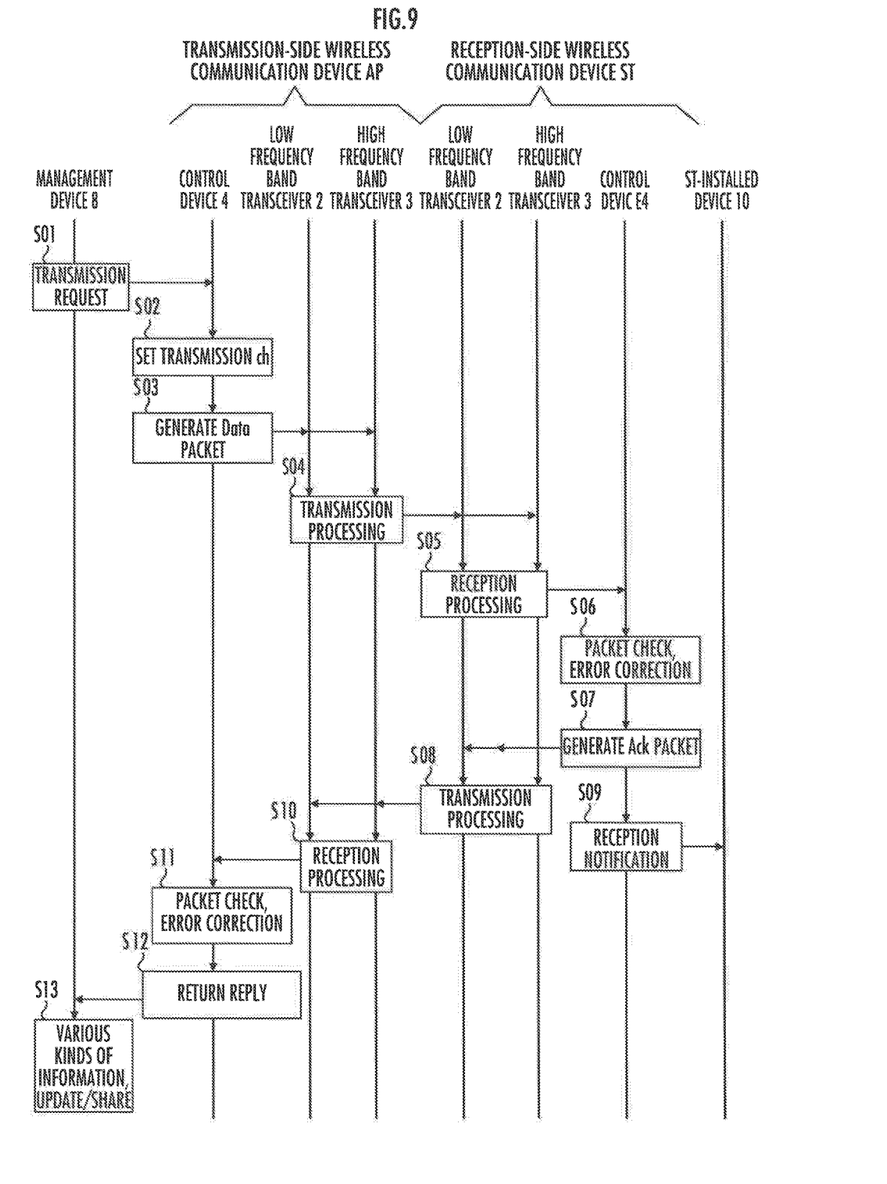
FIG. 9 is a system flow diagram of the wireless communication system.

The management device 8 requests the transmission-side wireless communication device AP to transmit data to the reception-side wireless communication device ST (step S01).

Upon reception of a transmission request transmitted from the management device 8, the transmission data generating unit 41 of the transmission-side wireless communication device AP reads out frequency band information and environment information from the storage unit 5, excludes ch's (channels) at which communication is impossible within the communication area, and sets a ch pair for carrier waves to be transmitted from the low frequency band transceiver 2 and the high frequency band transceiver 3 (step S02).

The transmission data generating unit 41 reads out necessary data from the storage unit 5 to generate a Data packet, and the data transmitting unit 42 specifies a ch pair of transmission frequencies and simultaneously transmits the Data packet to the respective transceivers 2 and 3 (step S03).

Each of the transceivers 2 and 3 performs transmission processing of generating a carrier wave modulated based on the Data packet, and transmitting the carrier wave to the reception-side wireless communication device ST (step S04).

When receiving the carrier wave from any one ch of the transmission ch pair (when receiving the carrier waves on both the transmission channels, an earlier received channel is selected), each of the transceivers 2 and 3 of the reception-side wireless communication device ST performs reception processing of transmitting the Data packet obtained by demodulating the carrier wave to the control device 4 (step S05).

The reception data obtaining unit 43 of the reception-side wireless communication device ST performs packet check to confirm whether there is a data error, performs error correction as required, and stores an obtained Data packet into the storage unit 5 (step S06).

The transmission data generating unit 41 read out necessary data from the storage unit 5 to generate an Ack packet, and the data transmitting unit 42 specifies a received frequency band ch, and simultaneously transmits the Ack packet to the transceivers 2 and 3 (step S07).

Each of the transceivers 2 and 3 performs transmission processing of generating a carrier wave modulated based on the Ack packet, and transmitting the thus-generated carrier wave to the transmission-side wireless communication device AP (step S08).

The transmission data generating unit 41 reads out necessary data from the Data packet in the storage unit 5, and notifies the reception to the control device 4 of the ST-installed device 10 in which the reception-side wireless communication device ST is installed (step S09).

Upon reception of the carrier wave, each of the transceivers 2 and 3 of the transmission-side wireless communication device AP performs reception processing of transmitting the Ack packet obtained by demodulating the carrier wave to the control device 4 (step S10).

The reception data obtaining unit 43 of the transmission-side wireless communication device AP performs packet check to confirm whether there is an error in data, performs error correction as required, and stores the obtained Ack packet into the storage unit 5 (step S11).

The data transmitting unit 42 return a reply to the management device 8 (step S12).

The management device 8 updates various kinds of information such as a transmission/reception result, etc. in the database stored in the storage device (step S13).

Figure 10:
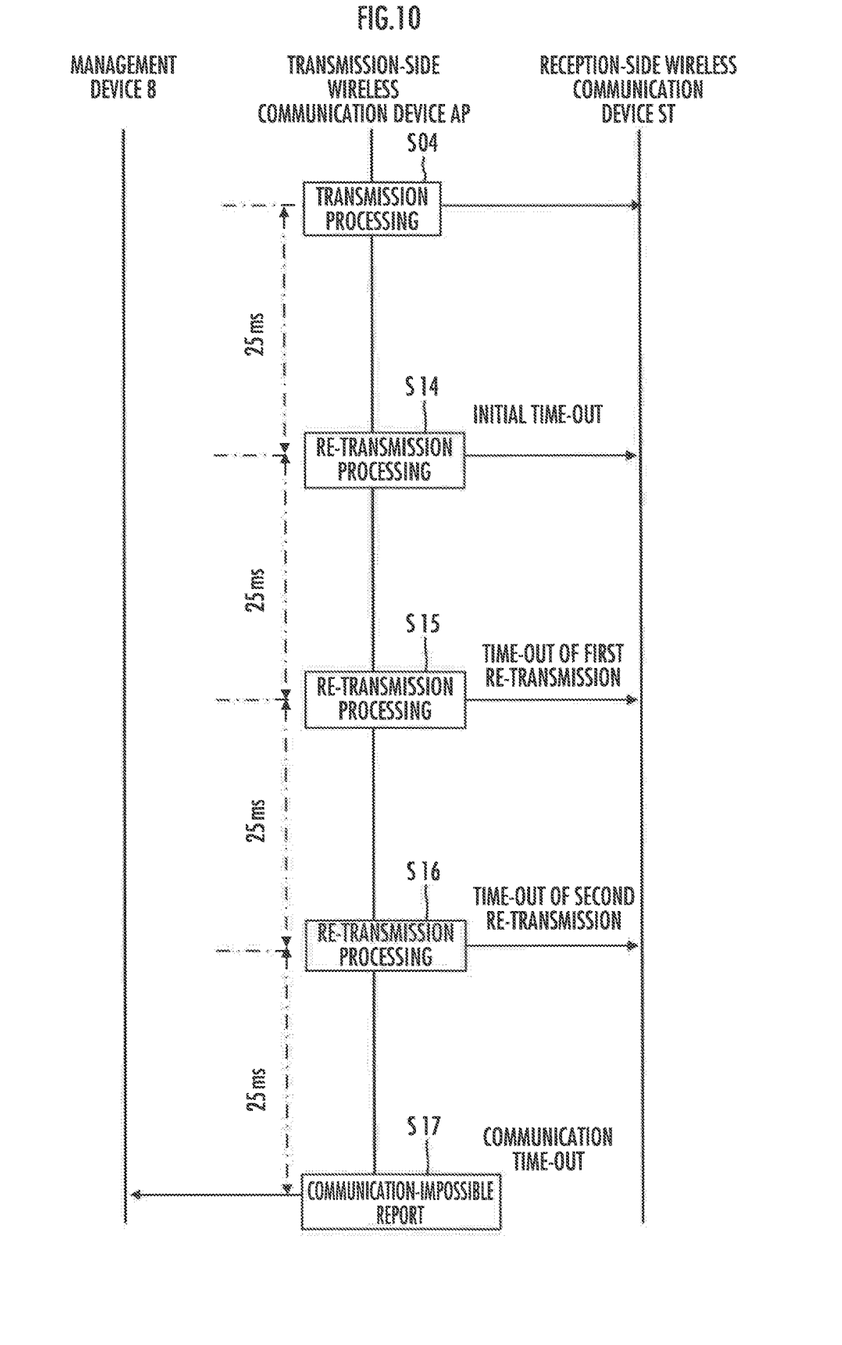
FIG. 10 is a system flow diagram of the wireless communication system when communication is impossible.

Subsequently, a processing flow of the wireless communication system 7 when the transmission-side wireless communication device AP cannot receive any Ack packet due to some cause will be described with reference to FIG. 10.

After performing the transmission processing of the step S04, the reception data obtaining unit 43 of the transmission-side wireless communication device AP determines based on the timer 6 whether a predetermined time (25 ms in this embodiment) has elapsed from the transmission of the Data packet. When the transmission-side wireless communication device AP has not yet received any Ack packet even after lapse of the predetermined time, the data transmitting unit 42 performs re-transmission processing of specifying the same frequency ch again and transmitting the Data packet to each of the transceivers 2 and 3 (initial time-out) (step S14).

The reception data obtaining unit 43 determines based on the timer 6 whether a predetermined time has elapsed from the processing of the step S14. When no Ack packet has been received even after the predetermined has elapsed, the data transmitting unit 42 performs the re-transmission processing of specifying the same frequency ch again and transmitting the Data packet of each of the transceivers 2 and 3 (time-out of first re-transmission) (step S15).

The reception data obtaining unit 43 determines based on the timer 6 whether a predetermined time has elapsed from the processing of the step S15. When no Ack packet has been received even after the predetermined time has elapsed, the data transmitting unit 42 performs the re-transmission processing of specifying the same frequency ch again and transmitting the Data packet to each of the transceivers 2 and 3 (time-out of second re-transmission) (step S16).

The reception data obtaining unit 43 determines based on the timer 6 whether a predetermined time has elapsed from the processing of the step S16. When no Ack packet has been received even after the predetermined time has elapsed, the data transmitting unit 42 transmits, to the management device 8, a notification representing that the communication has been impossible because of time-out (communication time-out) (step S17).

In this embodiment, the wireless communication system 7 is configured by using one transmission-side wireless communication device AP and one reception-side wireless communication device ST. However, the wireless communication system 7 may be configured by providing a plurality of transmission-side wireless communication devices AP or a plurality of reception-side wireless communication devices ST or by using a plurality of transmission-side wireless communication devices AP and a plurality of reception-side wireless communication devices ST.

When the wireless communication system 7 is configured by providing a plurality of transmission-side wireless communication devices AP, in step S13 the transmission/reception result stored in the database of the management device 8 may be shared by the respective transmission-side wireless communication devices AP, and communication may be performed by preferentially using ch which has been used when communication succeeded. Furthermore, the priority of use of ch which has been used when communication failed may be lowered.

In the foregoing embodiment, each of the transceivers 2 and 3 generates carrier waves modulated based on transmission data, and demodulates received carrier waves to obtain reception data. However, the embodiment is not limited to this example. For example, modulation and demodulation of carrier waves may be performed in the control device 4. Specifically, an A/D converter or a D/A converter may be provided to the control device 4.

As described above, the wireless communication system using the wireless communication device 1 can increase the possibility that the reception-side wireless communication device ST receive at least either data carried on a carrier wave transmitted by the low frequency band transceiver 2 or data carried on a carrier wave transmitted by the high frequency band transceiver 3. Accordingly, redundancy of communication can be realized with a compact and inexpensive configuration, and the communication error rate can be reduced.

In the wireless communication device 1, the low frequency band transceiver 2, the high frequency band transceiver 3 and the control device 4 are provided on a single board, and the connection between the control device 4 and the low frequency band transceiver 2 and the connection between the control device 4 and the high frequency band transceiver 3 are performed by an IC pattern, whereby in addition to achievement of miniaturization of the device, distribution impedance, a capacitance, a parasitic capacitance distribution, etc. can be made fixed. Therefore, dispersion among products can be reduced, and the operation can be stabilized.

The foregoing embodiment has been described by exemplifying the case where the same data are transmitted by the low frequency band transceiver 2 and the high frequency band transceiver 3. However, the same data may be transmitted with a time lag between the low frequency band transceiver 2 and the high frequency band transceiver 3.

Furthermore, simultaneously with execution of data reception by one of the low frequency band transceiver 2 and the high frequency band transceiver 3, the other transceiver may execute data transmission. Even in such a case, a side lobe portion of a data transmission wave is cut off by the low-side bandpass filter 22 or the high-side bandpass filter 32, so that data reception executed in the one of the transceivers can be performed with no problem.

The foregoing embodiment has been described by using an example in which the SAW filters are used as the low-side bandpass filter 22 and the high-side bandpass filter 32. However, the combination of a high-pass filter having a cut-off frequency lower than the frequency of Low 1ch and a low-pass filter having a cut-off frequency located in the separation band (ranging from 2422 to 2450 MHz) in Table 1 may be used as the low-side bandpass filter 22. Furthermore, the combination of a high-pass filter having a cut-off frequency located in the separation band (ranging from 2422 MHz to 2450 MHz) in Table 1 and a low-pass filter having a cut-off frequency higher than the frequency of High 10 ch may be used as the high-side bandpass filter 32.

Furthermore, a low-pass filter and a high-pass filter whose cut-off frequencies are located in the separation band (ranging from 2422 to 2450 MHz) in Table 1 may be used as the low-side bandpass filter 22 and the high-side bandpass filter 32, respectively.

What is claimed is:

1. A wireless communication device comprising:
    a first transceiver configured to perform communication by using each of a plurality of channels contained in a first frequency band;
    a second transceiver configured to perform communication by using each of a plurality of channels contained in a second frequency band that is higher than the first frequency band and separated from the first frequency band through a separation band having a predetermined frequency span; and
    a control device that is connected to the first transceiver and the second transceiver so as to be capable of communicating with the first transceiver and the second transceiver, selects one channel from the plurality of channels of the fist frequency band and one channel from the plurality of channels of the second frequency band to set a channel pair including a pair of channels, and causes the first transceiver and the second transceiver to communicate identical data by using the set channel pair.

2. The wireless communication device according to claim 1, further comprising:
    a first filter that is connected to the first transceiver and cuts frequency components of the second frequency band from frequency components passing through the first transceiver, and
    a second filter that is connected to the second transceiver and cuts frequency components of the first frequency band from frequency components passing through the second transceiver.

3. The wireless communication device according to claim 2, wherein cut-off frequencies of the first filter and the second filter are located in the separation band.

4. The wireless communication device according to claim 1, wherein the first transceiver, the second transceiver and the control device are provided to a single board.

5. A wireless communication system including a plurality of wireless communication devices, each of the plurality of wireless communication devices comprising:
- a first transceiver configured to perform communication by using each of a plurality of channels contained in a first frequency band;
- a second transceiver configured to perform communication by using each of a plurality of channels contained in a second frequency band that is higher than the first frequency band and separated from the first frequency band through a separation band having a predetermined frequency span;
- a first filter that is connected to the first transceiver and cuts frequency components of the second frequency band from frequency components passing through the first transceiver;
- a second filter that is connected to the second transceiver and cuts frequency components of the first frequency band from frequency components passing through the second transceiver; and
- a control device that is connected to the first transceiver and the second transceiver so as to be capable of communicating with the first transceiver and the second transceiver, selects one channel from the plurality of channels of the fist frequency band and one channel from the plurality of channels of the second frequency band to set a channel pair including a pair of channels, and causes the first transceiver and the second transceiver to communicate identical data by using the set channel pair, wherein one wireless communication device out of the plurality of wireless communication devices transmits the identical data to another wireless communication device out of the plurality of wireless communication devices by using the set channel pair, and the another wireless communication device receives the transmitted data by using either channel of the set channel pair.

* * * * *